US012258908B2

United States Patent
Stretton et al.

(10) Patent No.: US 12,258,908 B2
(45) Date of Patent: Mar. 25, 2025

(54) MODULAR CABIN BLOWER SYSTEM FOR AIRCRAFT

(71) Applicant: ROLLS-ROYCE plc, London (GB)

(72) Inventors: Richard G. Stretton, Ashby-de-la-Zouch (GB); Richard Sharpe, Leek (GB)

(73) Assignee: Rolls-Royce plc, London (GB)

( * ) Notice: Subject to any disclaimer, the term of this patent is extended or adjusted under 35 U.S.C. 154(b) by 56 days.

(21) Appl. No.: 17/401,647

(22) Filed: Aug. 13, 2021

(65) Prior Publication Data

US 2022/0065171 A1 Mar. 3, 2022

(30) Foreign Application Priority Data

Aug. 28, 2020 (GB) ..................................... 2013514

(51) Int. Cl.
*F02C 7/32* (2006.01)
*F02C 7/18* (2006.01)
*F02K 3/04* (2006.01)

(52) U.S. Cl.
CPC .................. *F02C 7/32* (2013.01); *F02C 7/18* (2013.01); *F02C 7/185* (2013.01); *F02K 3/04* (2013.01); *F05D 2260/40311* (2013.01)

(58) Field of Classification Search
CPC .... F02C 7/32; B64D 2013/0603–0607; B64D 2013/0644; B64D 2013/0618–0622;
(Continued)

(56) References Cited

U.S. PATENT DOCUMENTS 4,523,517 A * 6/1985 Cronin ................... B64D 13/06
237/2 A
9,470,153 B2 * 10/2016 Suciu ........................ F02C 7/32
(Continued)

FOREIGN PATENT DOCUMENTS

| EP | 3517436 A1 | 7/2019 |
| EP | 3517437 A1 | 7/2019 |
| EP | 3517438 A1 | 7/2019 |
| GB | 2076897 A | 12/1981 |

OTHER PUBLICATIONS

Great Britain search report dated Nov. 30, 2020, issued in GB Patent Application No. 2013514.1.
European search report dated Jan. 6, 2022, issued in EP application No. 21188383.
(Continued)

*Primary Examiner* — Stephanie Sebasco Cheng
(74) *Attorney, Agent, or Firm* — Shumaker & Sieffert, P.A.

(57) ABSTRACT

A gas turbine engine includes an engine core including a compressor, a combustor, and a turbine, the compressor being connected to the turbines through a respective shaft; and a cabin blower system comprising: an electric variator comprising a first electrical machine connected to a first shaft arranged along a first axis, a second electrical machine connected to a second shaft arranged along a second axis, and a power management system; a cabin blower comprising a compressor driven by a third shaft arranged along a third axis, the compressor comprising an air inlet and an air outlet; and a differential gearbox. The gas turbine engine further includes an accessory gearbox arranged within an accessory gearbox casing and adapted to drive the cabin blower system.

14 Claims, 11 Drawing Sheets (58) Field of Classification Search
CPC .......... B64D 2013/0611; B64D 13/02; F16H 2001/2881; F16H 2001/2872; F16H 2001/289; F16H 2001/36; F16H 2001/46; F16H 1/28–48; F16H 3/005; F16H 3/44–78; F16H 13/06; F16H 15/48–56; F16H 37/022; F16H 37/046; F16H 37/082; F16H 2037/047–048; F16H 48/06–11; F16H 2048/102–106; F16H 57/08–082; F16H 2057/085–087; F16H 2200/20–2017; F16H 2702/02–04; F16H 2716/00–14; F16H 2718/00–26; F16H 2720/04; F04D 25/06; F04D 25/068; F04D 25/0693; F04D 25/028; F04D 27/004; F04D 27/0261; F05D 2260/40311; F05D 2220/76–7646; F05D 2220/768

See application file for complete search history.

(56) References Cited

U.S. PATENT DOCUMENTS

| | | | |
|---|---|---|---|
| 10,125,684 B2 * | 11/2018 | Yu .............................. | F02K 3/06 |
| 10,385,777 B2 * | 8/2019 | Jen ............................ | F01D 9/02 |
| 10,648,368 B2 * | 5/2020 | Slayter ...................... | F02C 7/36 |
| 11,220,959 B2 * | 1/2022 | De Wergifosse ....... | F16H 3/727 |
| 2018/0266329 A1 * | 9/2018 | Mackin .................... | F02C 7/36 |
| 2019/0233125 A1 * | 8/2019 | Knight ..................... | F16H 3/08 |
| 2022/0243663 A1 * | 8/2022 | De Wergifosse ..... | F16H 57/082 |

OTHER PUBLICATIONS

Response to Extended Search Report dated Jan. 18, 2022, from counterpart European Application No. 21188383.0, filed Aug. 25, 2022, 53 pp.

* cited by examiner

MODULAR CABIN BLOWER SYSTEM FOR AIRCRAFT

CROSS-REFERENCE TO RELATED APPLICATIONS

This specification is based upon and claims the benefit of priority from United Kingdom Patent Application No. 2013514.1, filed on 28 Aug. 2020, the entire contents of which are incorporated herein by reference.

BACKGROUND

Technical Field

The present disclosure relates to cabin blower systems for aircraft, and in particular to a modular cabin blower system for an aircraft.

Description of the Related Art

Cabin blower systems are known for pressurising the cabin of an aircraft. Cabin blower systems provide an airflow to cabins of an aircraft at a controlled temperature and pressure for ventilation. The pressurised air from the cabin blower can also be used for other aircraft functions e.g. wing anti-icing, fuel tank inerting, cargo heating, and other aircraft systems pressurisation (e.g. hydraulic and potable water), A cabin blower system includes a cabin blower typically driven by a compressor, which in turn is driven by a shaft of the gas turbine engine via an accessory gearbox. As it is not desirable for the compressor of the cabin blower to rotate at a speed determined by the particular operating point of the gas turbine at any particular moment, the cabin blower system normally includes a variable drive system to vary the compressor speed and keep the cabin airflow and pressure within acceptable limits. The cabin blower is driven by the variable drive system, which in turn is connected to, and driven by, the accessory gearbox. The accessory gearbox is arranged in a core engine accessory bay, which is normally quite congested. As the variable drive system includes several components, such as electrical motors/generators and a summing gearbox, and is integrated with the cabin blower into a single combined unit, known cabin blower systems are bulky and present several installation and integration challenges.

There is therefore a need for a cabin blower system with improved installation and integration capabilities.

SUMMARY

According to a first aspect, there is provided a gas turbine engine including an engine core including a compressor, a combustor, and a turbine, the compressor being connected to the turbines through a respective shaft; a cabin blower system comprising: an electric variator comprising a first electrical machine connected to a first shaft arranged along a first axis, a second electrical machine connected to a second shaft arranged along a second axis, and a power management system; a cabin blower comprising a compressor driven by a third shaft, the compressor comprising an air inlet and an air outlet; and a differential gearbox. The gas turbine engine further includes an accessory gearbox arranged within an accessory gearbox casing and adapted to drive the cabin blower system.

In one group of embodiments, the first and second electrical machines are arranged on a first side of the accessory gearbox casing and the cabin blower is arranged on a second side of the accessory gearbox casing.

In another group of embodiments, the first electrical machine, the second electrical machine, and the cabin blower are arranged on a same side of the accessory gearbox casing such that the third shaft is not coaxial with either the first or the second shaft.

The cabin blower, the first electrical machine, the second electrical machine, and the differential gearbox may be configured as modules, such that the cabin blower system may be configured to best fit in the core engine accessory bay where the accessory gearbox is arranged.

Contrary to the known cabin blower systems, the cabin blower, the first electrical machine, the second electrical machine, and the differential gearbox of the present disclosure may be split and arranged to be housed where space is available around the accessory gearbox.

Depending on the available space in the core engine accessory bay, the cabin blower, first electrical machine, second electrical machine, and differential gearbox may be split in two or more groups of modules and arranged on a single side of the accessory gearbox, or on two different sides of the accessory gearbox casing. The two different sides of the accessory gearbox casing may be opposite to each other.

The latter arrangements, with the modules split in groups on opposite sides of the accessory gearbox, may be particularly advantageous, as it may allow for a more compact arrangement and may reduce overhang and unbalance.

For example, the electric variator may be arranged on a first side of the accessory gearbox casing and the differential gearbox and/or the cabin blower may be arranged on a second side of the accessory gearbox casing. The first side of the accessory gearbox casing may be opposite to the second side of the accessory gearbox casing.

The electric variator and the differential gearbox may be arranged on a common axis. Alternatively, the electric variator and the differential gearbox may be arranged on separate axes.

The electric variator and the cabin blower may be arranged on a common axis. Alternatively, the electric variator and the cabin blower may be arranged on separate axes.

The second side of the accessory gearbox may be opposite the first side of the accessory gearbox.

The accessory gearbox may include a plurality of drive output pads to connect with a number of engine accessories, including fuel and oil pumps.

The accessory gearbox is arranged within an accessory gearbox casing. The accessory gearbox and accessory gearbox casing may be arranged either axially, substantially parallel to a longitudinal axis of the gas turbine engine, or circumferentially about the longitudinal axis of the gas turbine engine.

The first and second electrical machines of the electric variator may be either ganged and coaxial, i.e. such that the first and second shafts are coaxial, or separate and arranged such that the first and second shafts are arranged on different axes.

At least one of the first and second shafts may be coaxial with a drive output pad of the plurality of drive output pads of the accessory gearbox.

The differential gearbox may be connected to, and coaxial with, a drive output pad of the plurality of drive output pads of the differential gearbox.

The cabin blower compressor may be arranged coaxially with the differential gearbox. The cabin blower compressor may be a centrifugal fan, one or more impellers, or any other known devices adapted to increase pressure of a gas.

The first shaft, the second shaft, and the third shaft may be arranged on respective, non-coincident axes.

The first and second electrical machines may be ganged and the first and second shafts may be coaxial with a drive output pad of the differential gearbox.

The cabin blower and the differential gearbox may be ganged and arranged on one side of the accessory gearbox.

The differential gearbox may comprise a first input connected the accessory gearbox, for example via the first shaft, a second input connected to the second shaft, and an output connected to the third shaft.

The output of the differential gearbox may be connected to the compressor of the cabin blower.

The differential gearbox may be an epicyclic gearbox comprising a summing gearbox and a step-up, amplifying gearbox.

The summing gearbox may be an epicyclic gearbox in a planetary configuration and may comprise a sun gear, a plurality of planet gears, a carrier connecting the planet gears, and a ring gear.

The first shaft may connect the accessory gearbox and the first electrical machine to drive the planet gears of the summing gearbox through the carrier, and the second shaft may connect the second electrical machine to the sun gear of the summing gearbox.

The step-up, amplifying gearbox may be an epicyclic gearbox in a star arrangement and may comprise a sun gear connected to the third shaft to drive the cabin blower.

The first and second electrical machines of the electric variator may be independently configured to work as electric motors and/or as power generators.

The gas turbine engine may further comprise a fan air offtake adapted to feed air to the cabin blower through the air inlet.

The gas turbine engine may comprise a bypass duct, and the fan air offtake may be arranged in the bypass duct.

The gas turbine engine may further comprise a bifurcation, or splitter, spanning the bypass duct and comprising a leading edge, a trailing edge, and a first and a second sidewall connecting the leading edge and the trailing edge. The fan air offtake may be either a forward facing offtake arranged on the bifurcation leading edge, or either a flush scoop or forward facing scoop on either the first or second sidewalls of the bifurcation.

The gas turbine engine may further comprise a heat exchanger to cool the cabin blower system. The heat exchanger may be either a surface heat exchanger or matrix cooler.

The heat exchanger may be a surface heat exchanger mounted from fairings of the engine core.

The compressor of the cabin blower may be a dual impeller, mounted from a single side of the gearbox casing. Alternatively, each impeller of the dual impeller may be mounted on opposite sides of the gearbox casing on a coaxial shaft.

In the present disclosure, upstream and downstream are with respect to the air flow through the compressor, and front and rear is with respect to the gas turbine engine, i.e. the fan being in the front and the turbine being in the rear of the engine. As used herein, forward refers to the direction from the rear to the front of the gas turbine engine.

The gas turbine engine may comprise an upper bifurcation, or upper sputter, and a lower bifurcation, or lower splitter, spanning the bypass duct and the fan air offtake may be arranged either on the upper splitter, or the lower splitter.

The skilled person will appreciate that except where mutually exclusive, any feature described herein may be applied to and/or combined with any other feature described herein.

DESCRIPTION OF THE DRAWINGS

Embodiments will now be described by way of example only, with reference to the Figures, in which.

DETAILED DESCRIPTION

Figure 1:
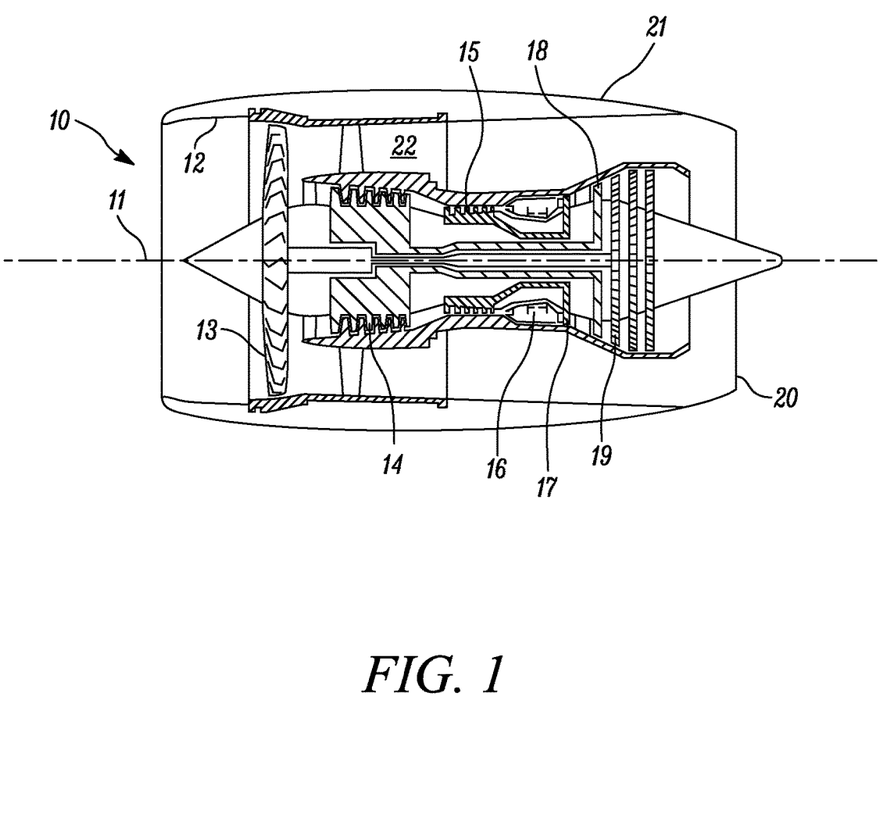
FIG. 1 is a sectional side view of a gas turbine engine.

With reference to FIG. 1, a gas turbine engine, generally indicated at 10, has a longitudinal axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example, such engines may have an alternative number of interconnecting shafts (e.g. two) and/or an alternative number of compressors and/or turbines. Further, the engine may comprise a gearbox provided in the drive train from a turbine to a compressor and/or fan.

Figure 2:
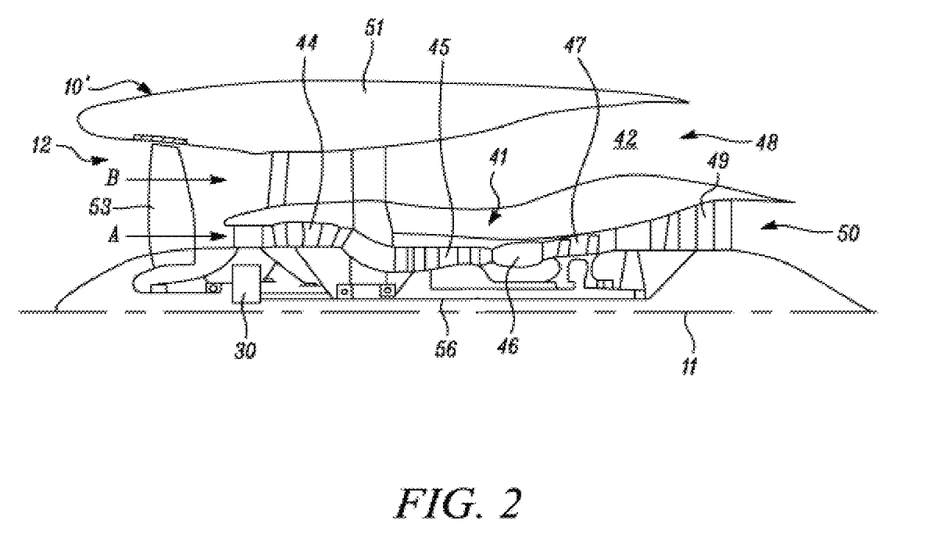
FIG. 2 is a sectional side view of a geared gas turbine engine.

FIG. 2 illustrates an example of gas turbine engine 10' comprising a gearbox 30 provided in the drive train from a turbine to the fan.

The gas turbine engine 10' has a longitudinal axis 11 and comprises a propulsive fan 53 and an engine core 41 comprising in axial flow series, a low pressure compressor 44, a high-pressure compressor 45, combustion equipment 46, a high-pressure turbine 47, a low pressure turbine 49 and a core exhaust nozzle 50. A nacelle 51 surrounds the gas turbine engine 10' and defines a bypass duct 42 and a bypass exhaust nozzle 48. The fan 53 is attached to and driven by the low pressure turbine 49 via a shaft 56 and an epicyclic gearbox 30. The epicyclic gearbox 30 is a reduction gearbox.

Figure 3:
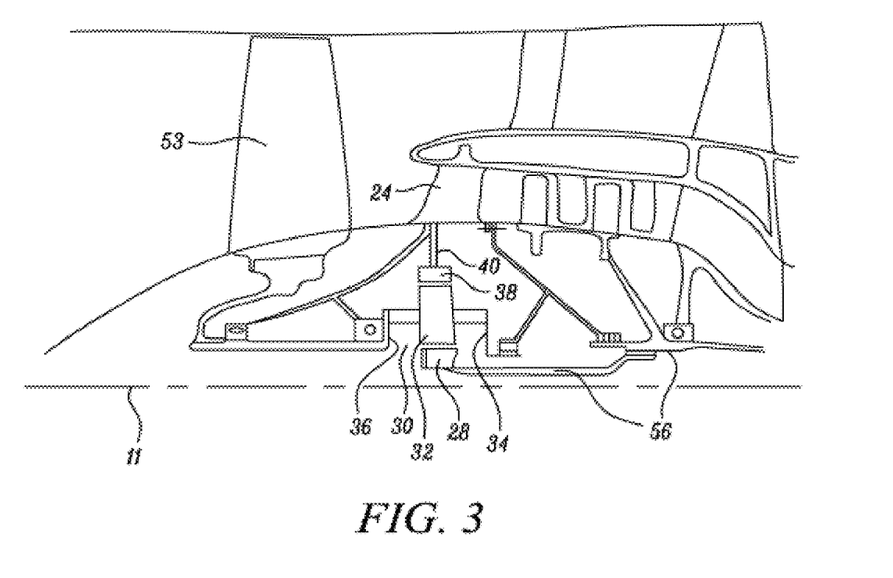
FIG. 3 is a close up sectional side view of an upstream portion of the geared gas turbine engine of FIG. 2.

FIG. 3 illustrates in more detail the gas turbine engine 10' and the gearbox 30 of FIG. 2. The gearbox 30 is of the epicyclic type. The low pressure turbine 49 (see FIG. 2) drives the shaft 56, which is coupled to a sun wheel, or sun gear, 28 of the gearbox 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 53 in order to drive its rotation about the longitudinal axis 11. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 53) respectively and/or the turbine and compressor stages that are connected together by the interconnecting shaft 56 with the lowest rotational speed in the engine (i.e. not including the gearbox output shaft that drives the fan 53). In some literature, the "low pressure turbine" and "low pressure compressor" referred to herein may alternatively be known as the "intermediate pressure turbine" and "intermediate pressure compressor". Where such alternative nomenclature is used, the fan 53 may be referred to as a first, or lowest pressure, compression stage.

The epicyclic gearbox 30 illustrated by way of example in FIG. 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 53 is driven by the ring gear 38. By way of further alternative example, the gearbox 30 may be a differential gearbox in which the ring gear 38 and the planet carrier 34 are both allowed to rotate.

Accordingly, the present disclosure extends to a gas turbine engine having any arrangement of gearbox styles (for example star or planetary), support structures, input and output shaft arrangement, and bearing locations.

Figure 4:
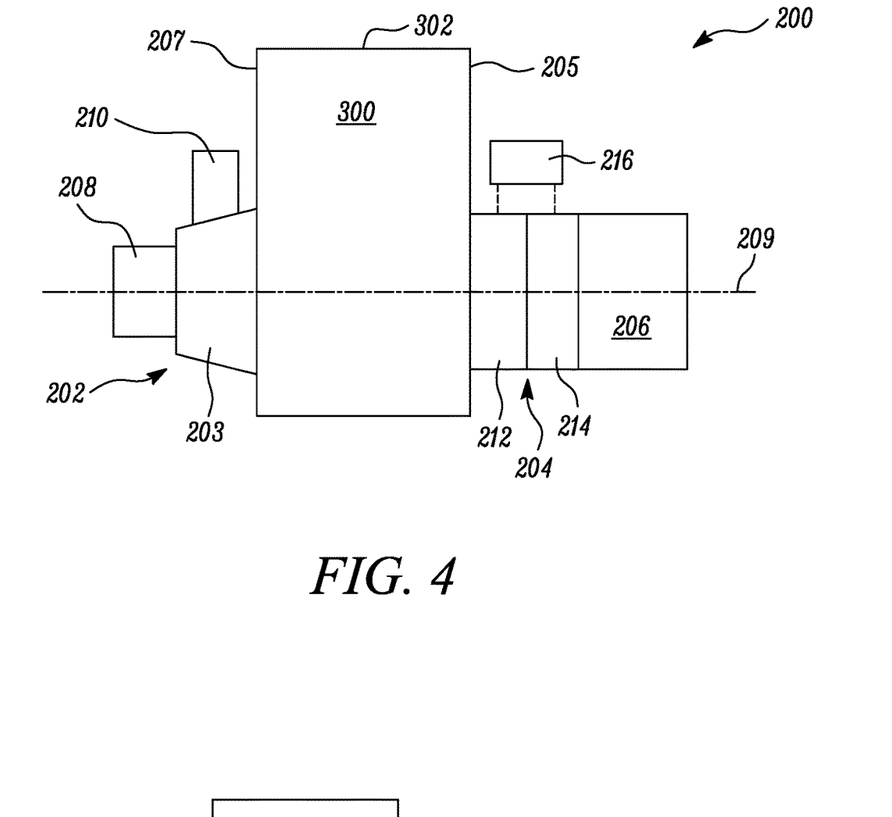
FIG. 4 is a schematic view of a cabin blower system connected to an accessory gearbox according to an embodiment.
Figure 5:
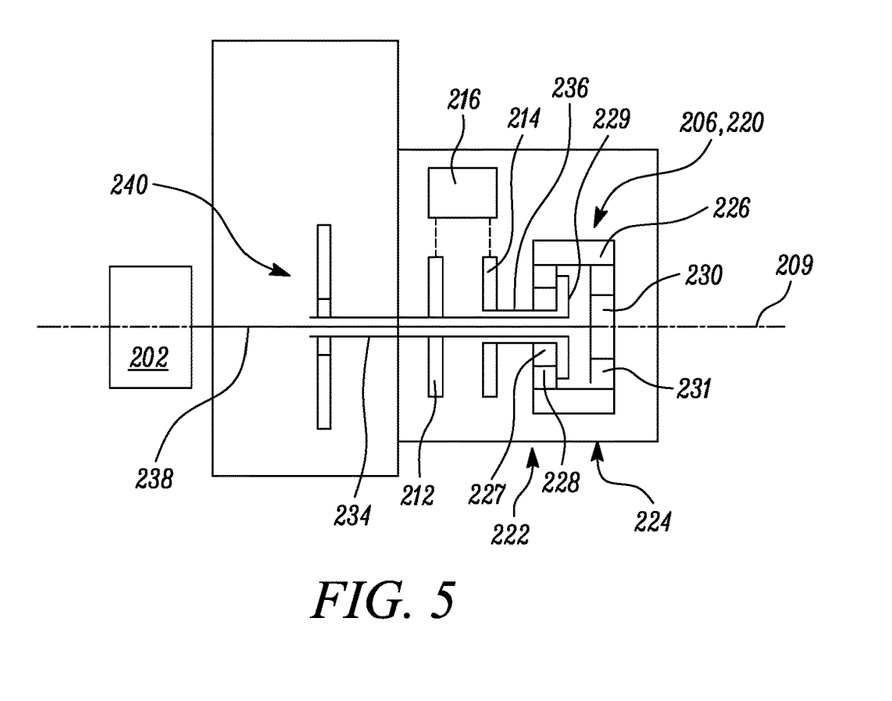
FIG. 5 is a schematic view of the cabin blower system and accessory gearbox of FIG. 4 showing the gear arrangement.

FIGS. 4 and 5 illustrate an embodiment of a modular cabin blower system 200 according to the disclosure connected to an accessory gearbox 300 arranged within an accessory gearbox casing 302.

The cabin blower system 200 includes a cabin blower 202, an electric variator 204, and a differential gearbox 206.

The cabin blower 202 comprises a compressor 203, an air inlet 208 and an air outlet 210. Air from the engine, for example from the bypass duct of the engine, is fed to the compressor 203 of the cabin blower 202 through the air inlet 208, compressed by the compressor 203, which in turn feeds the compressed air to the cabin of the aircraft via the air outlet 210. The compressor 203 may be a blower, or an impeller, or a pair of impellers.

The electrical variator 204 includes a first electrical machine 212, a second electrical machine 214, and a power management system 216.

The first and second electrical machines 212, 214 are each configured to work as electric motor and/or power generators. The power management system 216 interconnects the first and second electrical machines 212, 214 and controls whether each of the first and second electrical machines 212, 214 work as electric motor or power generator to drive the cabin blower 202 within specific operating conditions regardless the operating point of the gas turbine engine.

The differential gearbox 206 has a first input connected to a drive output pad 240 of the accessory gearbox 300 to receive drive therefrom.

The first electrical machine 212 is also connected to the same drive output pad 240 in this embodiment; in other embodiments, the first electrical machine 212 may be on a different drive output pad of the accessory gearbox 300.

The differential gearbox 206 has a second input connected to the second electrical machine 214, and an output connected to the cabin blower 202.

The electrical variator 204 and differential gearbox 206 are arranged on a first side 205 of the accessory gearbox casing 302; the cabin blower 202 is arranged on a second side 207 of the accessory gearbox casing 302 opposite the first side 205.

The cabin blower 202, the electrical variator 204, and differential gearbox 206 are coaxially arranged along a common axis 209.

FIG. 5 illustrates in more detail the arrangement of the differential gearbox 206 and how the first electrical machine 212, the second electrical machine 214, the differential gearbox 206, and the cabin blower 202 are connected to each other.

The differential gearbox 206 is an epicyclic gearbox 220 comprising a summing gearbox 222 and a step-up, amplifying gearbox 224.

A common ring gear 226 mutually connects the summing gearbox 222 and the amplifying gearbox 224. The summing gearbox 222 is an epicyclic gearbox in a planetary arrangement and includes a sun gear 227, a plurality of planet gears 228, a carrier 229 connecting the planet gears 228, and the ring gear 226. The planet gears 228, according to the planetary arrangement, rotate about their own axis and precess around the sun gear 227.

The amplifying gearbox 224 is an epicyclic gearbox in a star arrangement and comprises a sun gear 230, a plurality of planet gears 231, and the ring gear 226. The planet gears 231, according to the star arrangement, are held stationary with respect to the sun gear 230, and rotate about their own axis only.

A first shaft 234, driven by the drive output pad 240 of the accessory gearbox 300, is connected to the first electrical machine 212 and to the differential gearbox 206, in particular to the planet gears 228 of the summing gearbox 222 via the carrier 229. The first shaft 234 represents the first input of the summing gearbox 222. The first shaft 234 passes through the accessory gearbox casing 302 in correspondence of the first side 205 to connect the drive output pad 240 and the carrier 229. The first shaft 234 is connected at a first end portion to the accessory gearbox 206 and at a second end portion to the summing gearbox 222.

A second shaft 236 is connected to the differential gearbox 206, in particular to the sun gear 227 of the summing gearbox 222. The second shaft 236 represents the second input of the differential gearbox 206. The second shaft 236 is arranged outside the accessory gearbox 302 and does not pass through the accessory gearbox casing 302.

A third shaft 238 is connected at a first end portion to the differential gearbox 206, in particular to the sun gear 230 of the amplifying gearbox 224, and at a second end portion is connected to, and drives, the cabin blower 202, in particular the compressor 203. The third shaft 238 represents the output of the differential gearbox 206. The third shaft 238 connects the differential gearbox 206 arranged on the first side 205 of the accessory gearbox casing 302 to the cabin blower 202 arranged on the second side 207 of the accessory gearbox casing 302, passing all the way through the accessory gearbox 300.

In the embodiment of FIGS. 4 and 5, the first, second and third shafts 234, 236, 238 are coaxial and arranged along the common axis 209.

Figure 6:
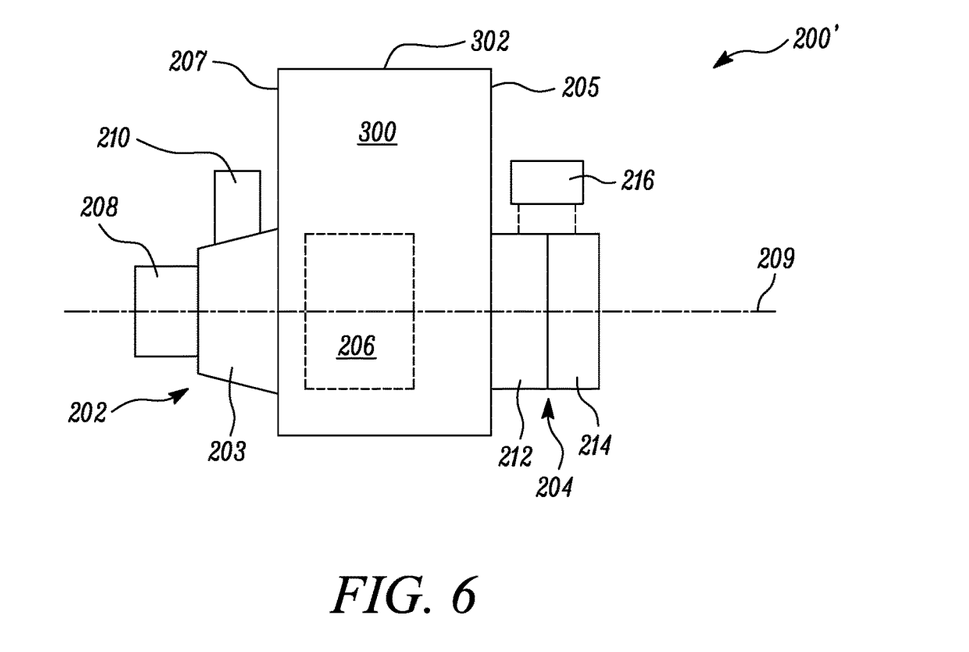
FIG. 6 is a schematic view of a cabin blower system connected to an accessory gearbox according to another embodiment.
Figure 7:
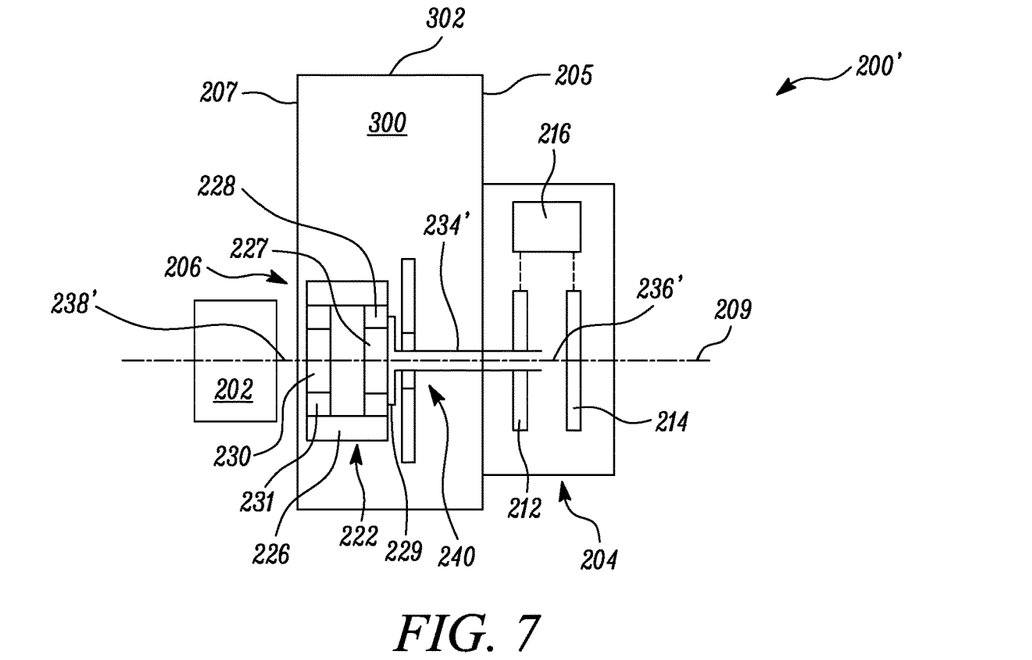
FIG. 7 is a schematic view of the cabin blower system and accessory gearbox of FIG. 6 showing the gear arrangement.

FIGS. 6 and 7 illustrate a cabin blower system 200' according to an embodiment similar to the embodiment of FIGS. 4 and 5, and differing therefrom for the arrangement of the differential gearbox 206. Like features between FIGS. 4, 5 and 6, 7 are given like reference numerals, and will not be described in detail again in relation to FIGS. 6 and 7.

Figure 8:
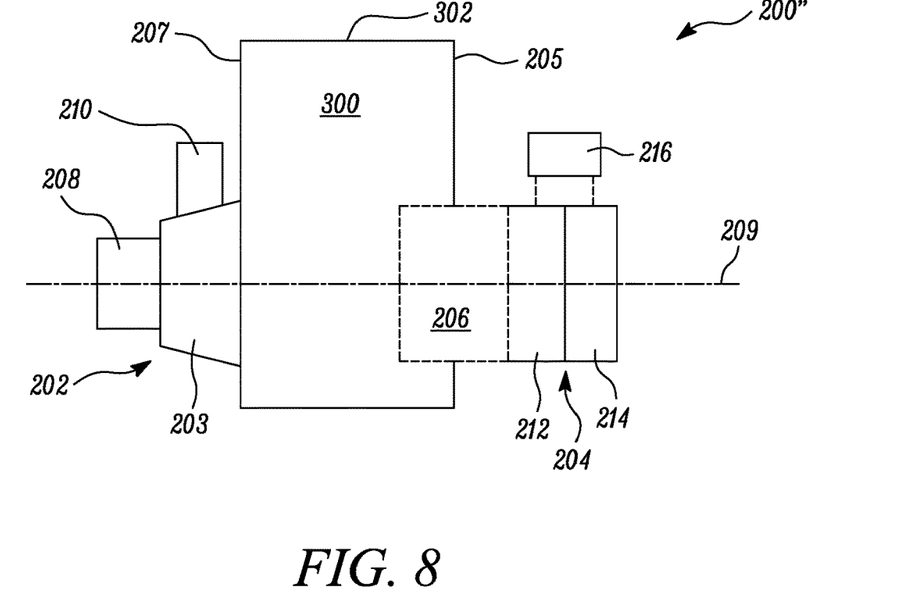
FIG. 8 is a schematic view of the cabin blower system and accessory gearbox wherein the cabin blower system is split into modules arranged on different sides of the accessory gearbox according to another embodiment.

In the FIGS. 6 and 7 embodiment the electrical variator 204 is arranged on the first side 205 of the accessory gearbox casing 302, the cabin blower 202 is arranged on the second side 207 of the accessory gearbox casing 302, and the differential gearbox 206 is integrated with the accessory gearbox 300 and arranged within the accessory gearbox casing 302. The cabin blower system 200' is particularly compact and suitable where limited space is available. In alternative embodiments, for example in the cabin blower system 200" illustrated in FIG. 8, the differential gearbox 206 is arranged only partially within the accessory gearbox casing 302 and protrudes thereof. However, without limitation, integrating the differential gearbox, even only partially, within the differential gearbox may add complexity to the cabin blower system.

The first shaft 234' is connected at a first end portion to the first electrical machine 212 and at a second end portion to the differential gearbox 206, in particular the carrier 229 of the summing gearbox 222. The first shaft 234' is driven by the accessory gearbox 300, which is arranged between the electrical variator 204 and the differential gearbox 206. In details, gears of the accessory gearbox 300 are connected to, and drive, the first shaft 234' and are arranged at an axial position along the first shaft 234' between the differential gearbox 206 and the first electrical machine 212.

The second shaft 236' connects the second electrical machine 214 to the sun gear 227 of the summing gearbox 222. As the sun gear 227 is arranged within the accessory gearbox 300 and the second electrical machine 214 is arranged outside the accessory gearbox 30, the second shaft 236' passes through the first side 205 of the accessory gearbox casing 302 and is longer than the second shaft 236 of the FIGS. 4 and 5 embodiment.

The third shaft 238' is connected to the differential gearbox 206, in particular to the sun gear 230 of the amplifying gearbox 224, and drives the cabin blower 202. As the sun gear 230 is arranged within the accessory gearbox 300 and the cabin blower 202 is arranged outside the accessory gearbox 300 on the second side 207, the third shaft 238' passes through the second side 207 of the accessory gearbox casing 302. The third shaft 238' is shorter than the third shaft 238 of the FIGS. 4 and 5 embodiment.

Like in the embodiment of FIGS. 4 and 5, the first, second and third shafts 234', 236', 238' are coaxial and arranged along the common axis 209.

FIGS. 9-15 illustrate various embodiments of cabin blower systems according to the disclosure, wherein the electrical variator 204 is arranged on the first side 205 of the accessory gearbox casing 302, and the cabin blower 202 is arranged on the second side 207 of the accessory gearbox casing 302. Like features between FIGS. 4-7 and 9-15 are given like reference numerals, and will not be described in detail again in relation to FIGS. 9-15.

Figure 9:
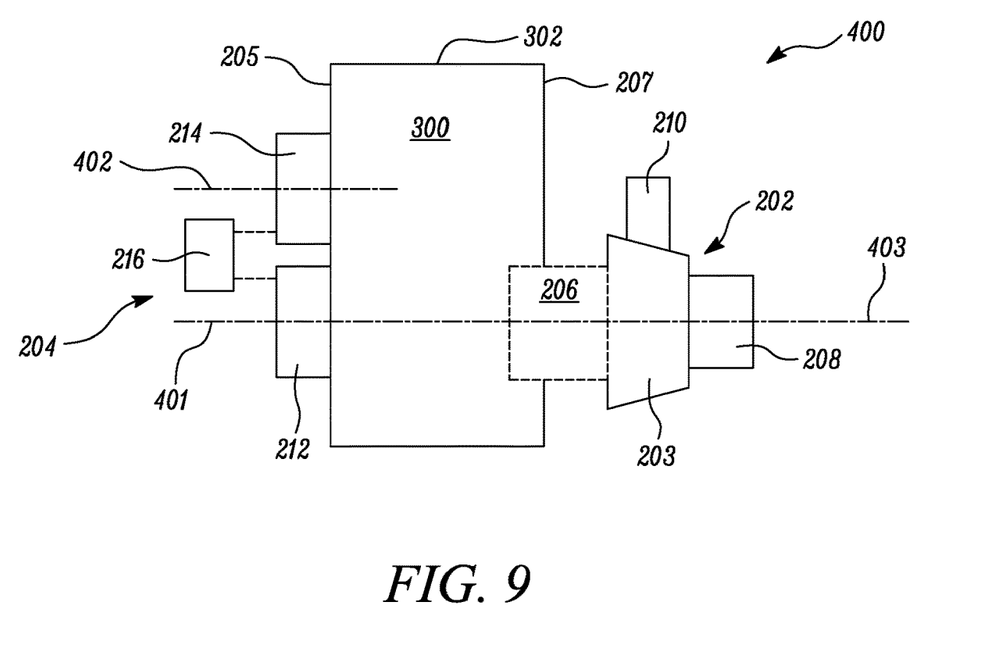
FIG. 9 is a schematic view of the cabin blower system and accessory gearbox wherein the cabin blower system is split into modules arranged on different sides of the accessory gearbox according to another embodiment.

In detail, FIG. 9 illustrates a cabin blower system 400 wherein the differential gearbox 206 is partly integrated in the accessory gearbox 300 and protrudes from the second side 207 of the accessory gearbox casing 302. The electric variator 204 is arranged on the first side 205 of the accessory gearbox casing 302.

The first electrical machine 212 and the second electrical machines 214 are connected to the first shaft, and the second shaft, not shown for sake of simplicity. The first shaft and the second shaft are not coaxial. In particular the first shaft is arranged on a first axis 401, and the second shaft is arranged on a second axis 402. The first axis 401 and the second axis 402 may, as in the illustrated embodiment, or may not, be parallel. The first shaft is directly connected to the differential gearbox 206; the second shaft is connected to the differential gearbox 206 through known, and therefore not illustrated, gear systems.

Connected to the differential gearbox 206 and arranged on the second side 207 of the accessory gearbox 300 there is the cabin blower 202 with the compressor 203, the air inlet 208 and the air outlet 210. The compressor 203 is driven by a third shaft, not shown for sake of simplicity, arranged on a third axis 403, coaxial to the first axis 401.

Figure 10:
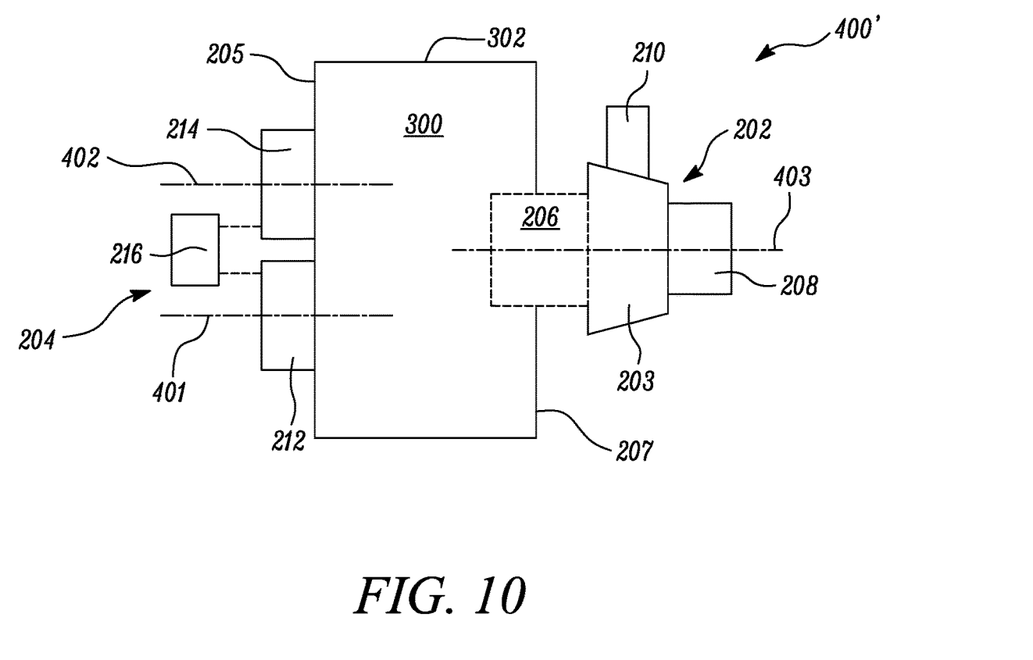
FIG. 10 is a schematic view of the cabin blower system and accessory gearbox wherein the cabin blower system is split into modules arranged on different sides of the accessory gearbox according to another embodiment.

FIG. 10 illustrates a cabin blower system 400' which differs from the cabin blower system 400 of FIG. 9 in that the first axis 401 and the third axis 403 are not coaxial. The differential gearbox 206 and the cabin blower 202 are arranged such that the third axis 403 is parallel to the first axis 401 and the second axis 402, and is equidistant therefrom. In not illustrated embodiments, the third axis 403 may be closer to either the first axis 401 or the second axis 402 than the second axis 402 or the first axis 401, respectively. In further not illustrated embodiment, the first, second, and third axis 401, 402, 403 may not be mutually parallel; for example, the first and second axis 401, 402 may be mutually parallel and the third axis 403 may be arranged at an angle thereto. Known, and therefore not illustrated, gear systems connect the first and second shaft to the differential gearbox 206.

Figure 11:
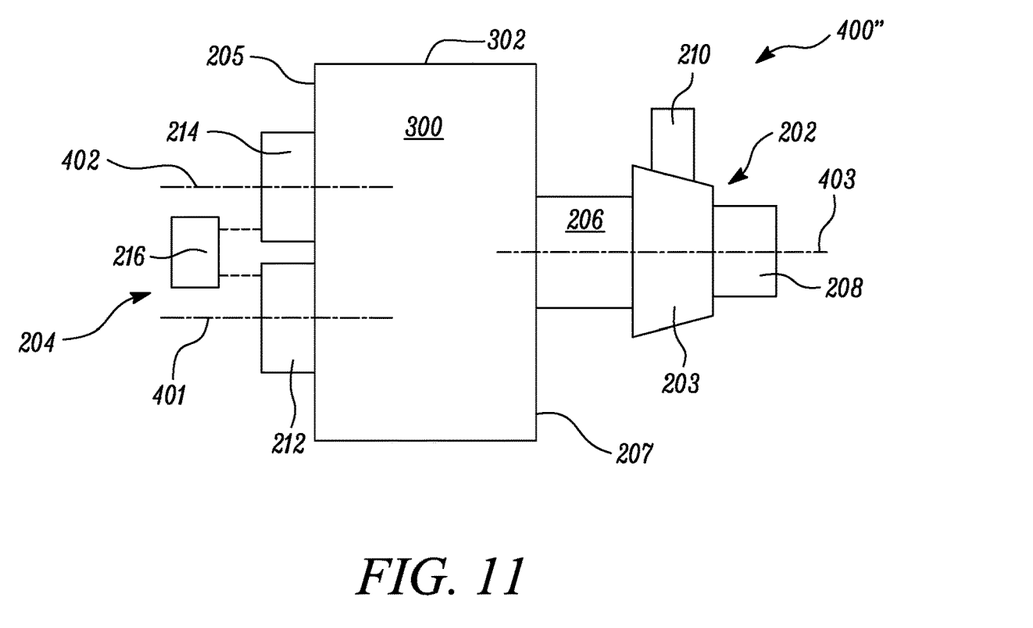
FIG. 11 is a schematic view of the cabin blower system and accessory gearbox wherein the cabin blower system is split into modules arranged on different sides of the accessory gearbox according to another embodiment.

FIG. 11 illustrates a cabin blower system 400" which differs from the cabin blower system 400' of FIG. 10 in that the differential gearbox 206 is not integrated in the accessory gearbox 300 and is arranged outside thereof. The differential gearbox is arranged on the second side 207 of the accessory gearbox casing 302 between the accessory gearbox 300 and the cabin blower 202. In a not illustrated embodiment, the differential gearbox 206 and the cabin blower 202 are arranged such that the third axis 403 is coaxial to the first axis, as in the embodiment of FIG. 9. Such embodiment would differ from the embodiment of FIG. 9 in that the differential gearbox 206 is not integrated in the accessory gearbox 300.

Figure 12:
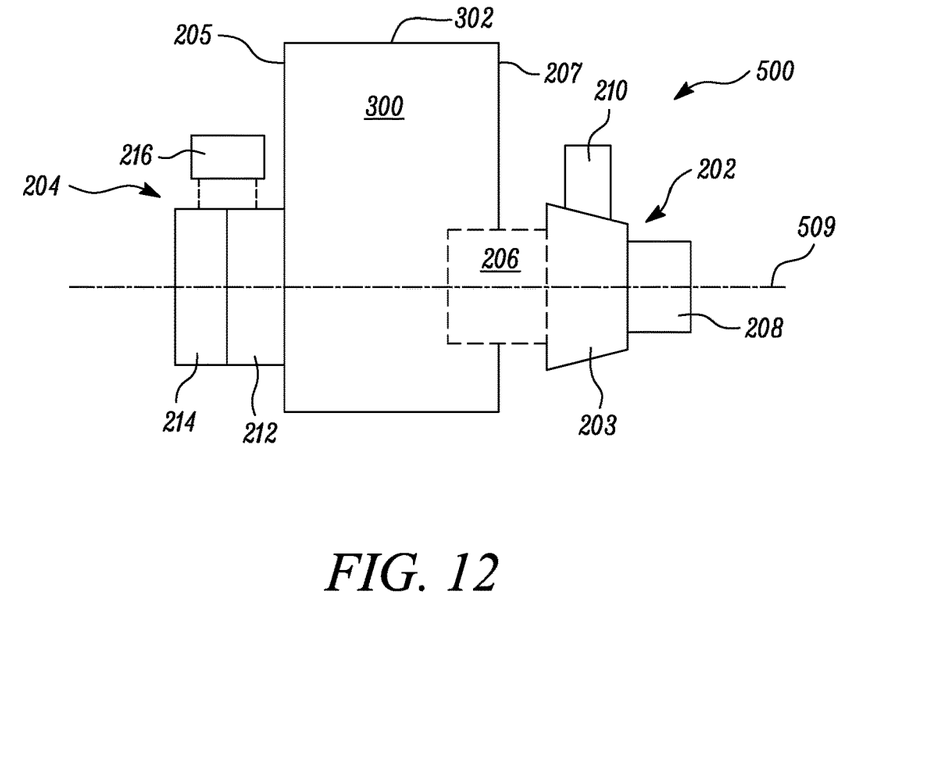
FIG. 12 is a schematic view of the cabin blower system and accessory gearbox wherein the cabin blower system is split into modules arranged on different sides of the accessory gearbox according to another embodiment.
Figure 13:
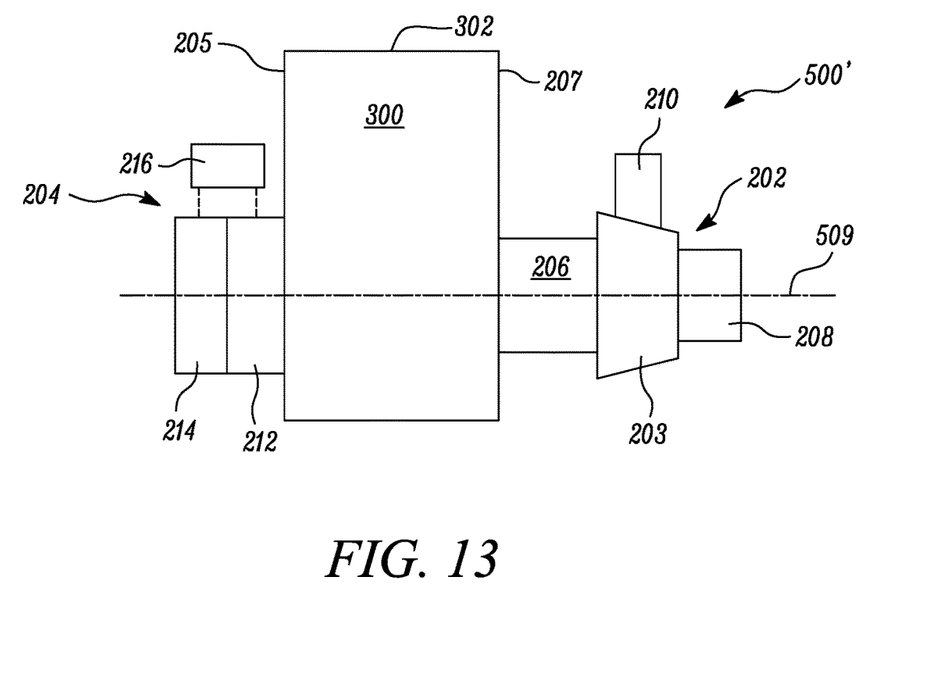
FIG. 13 is a schematic view of the cabin blower system and accessory gearbox wherein the cabin blower system is split into modules arranged on different sides of the accessory gearbox according to another embodiment.
Figure 14:
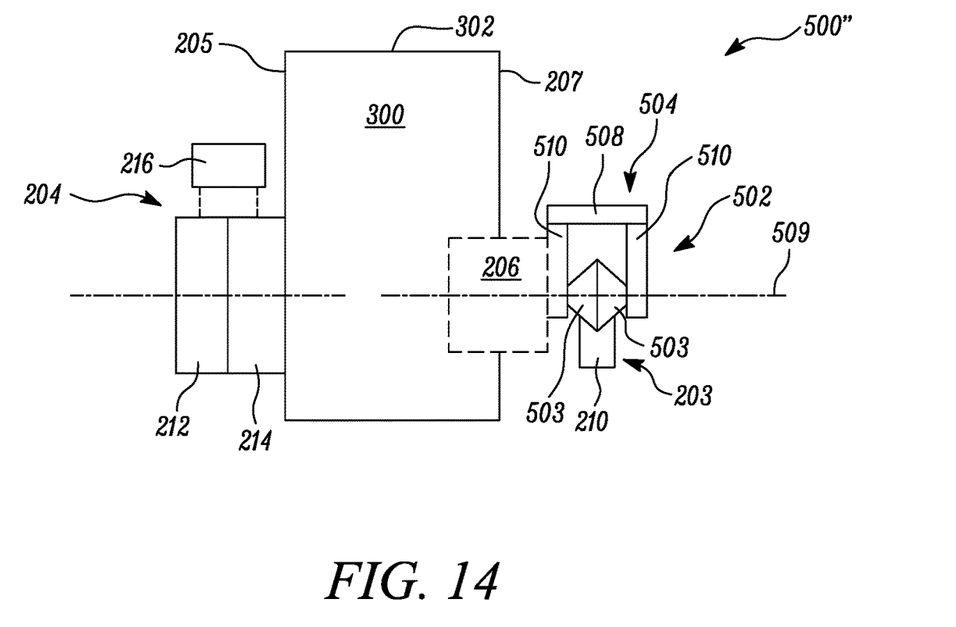
FIG. 14 is a schematic view of the cabin blower system and accessory gearbox wherein the cabin blower system is split into modules arranged on different sides of the accessory gearbox according to another embodiment.

FIGS. 12, 13, and 14 illustrate further embodiments of cabin blower systems according to the disclosure wherein the first, second, and third shafts (not illustrated for sake of simplicity) are arranged such that their respective first, second, and third axis are coaxial and arranged on a common axis 509.

The electrical variator 204 is arranged on the first side 205 of the accessory gearbox 300 and the first and second electrical machines 212, 214 are arranged coaxially. The first electrical machine 212 is arranged between the second electrical machine 214 and the accessory gearbox 300. In not illustrated embodiments, the second electrical machine 214 is arranged between the first electrical machine 212 and the accessory gearbox 300.

The differential gearbox 206 is arranged on the second side 207 of the accessory gearbox casing 302 and may be partly integrated in the accessory gearbox 300, as in the cabin blower system 500 of FIG. 12 and in the cabin blower system 500" of FIG. 14, or arranged outside the accessory gearbox 300 as in the cabin blower system 500' of FIG. 13.

The cabin blower system 500" of FIG. 14 differs from the cabin blower systems 500, 500' of FIGS. 12 and 13 in that it includes a cabin blower 502 different from the cabin blower 202. The cabin blower 502 comprises a compressor 203 in the form of a pair of impellers 503 and an air inlet system 504 comprising a manifold 508 and two inlet ducts 510. The impellers 503 are arranged back to back in order to minimise/eliminate thrust load. In not illustrated embodiments, the impellers may be positioned on opposing faces of the accessory gearbox, for example on a coaxial shaft.

Air from the engine, for example from the bypass duct of the engine, is fed to the manifold 508 and in turn to the impellers 503 through the air inlet ducts 510, compressed by the impellers 503, which in turn feeds the compressed air to the cabin of the aircraft via the air outlet 210. Each inlet duct 510 feeds a respective impeller 503.

Figure 15:
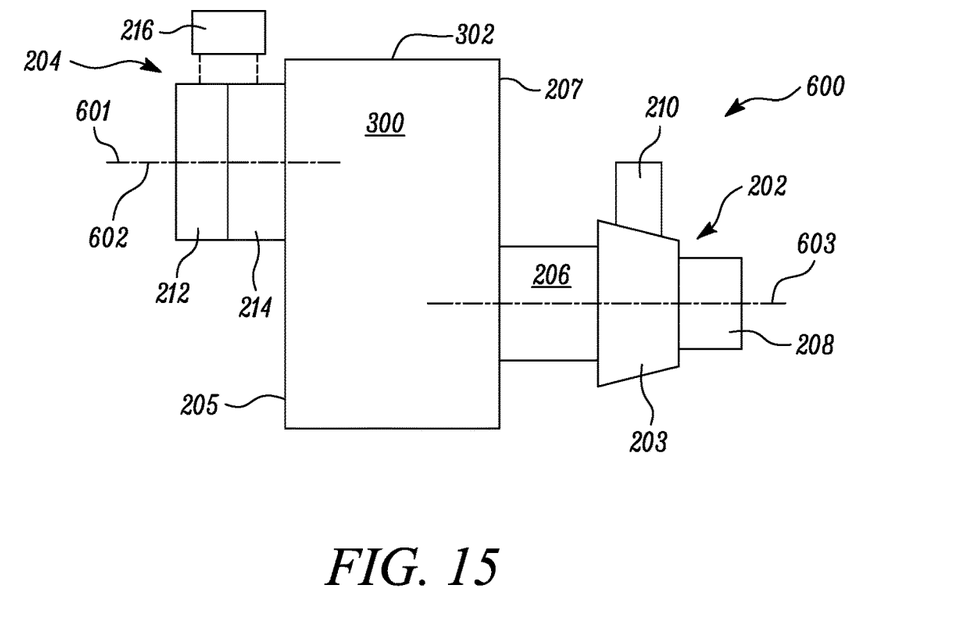
FIG. 15 is a schematic view of the cabin blower system and accessory gearbox wherein the cabin blower system is split into modules arranged on different sides of the accessory gearbox according to another embodiment.

FIG. 15 illustrates an embodiment of cabin blower system 600 wherein the electric variator 204 is arranged on the first side 205 of the accessory gearbox casing 302 with the first electrical machine 212 and the second electrical machine 214 coaxially arranged. In other words, a first and a second shaft (not shown for sake of simplicity) are connected to the first electrical machine 212 and the second electrical machine 214, respectively, and are arranged along respective first and second axis 601, 602. The first and second axis 601, 602 are coaxial. The differential gearbox 206 and the cabin blower 202 are arranged on the second side 207 of the accessory gearbox casing 302. The cabin blower 202 includes a compressor 203 driven by a third shaft, not shown for sake of simplicity, arranged on a third axis 603. The first and second axis 601, 602 are parallel to the third axis 603, and mutually distanced. The first shaft and the second shaft are connected to the differential gearbox 206 through a known, and therefore not illustrated, gear system.

Figure 16:
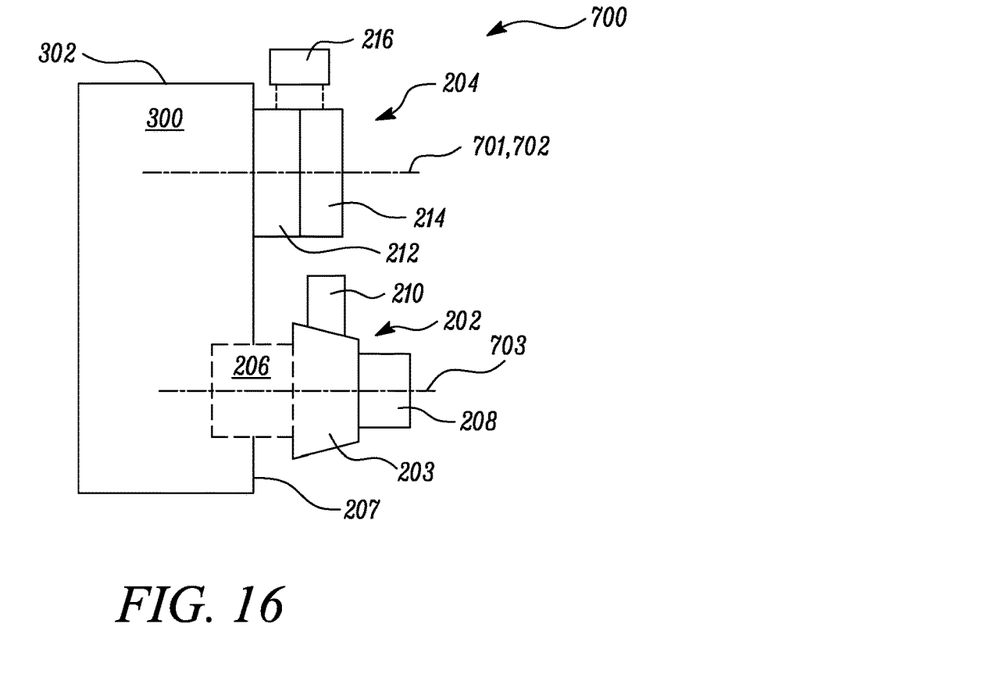
FIG. 16 is a schematic view of the cabin blower system and accessory gearbox wherein the cabin blower system is split into modules arranged on a same side of the accessory gearbox according to another embodiment.
Figure 17:
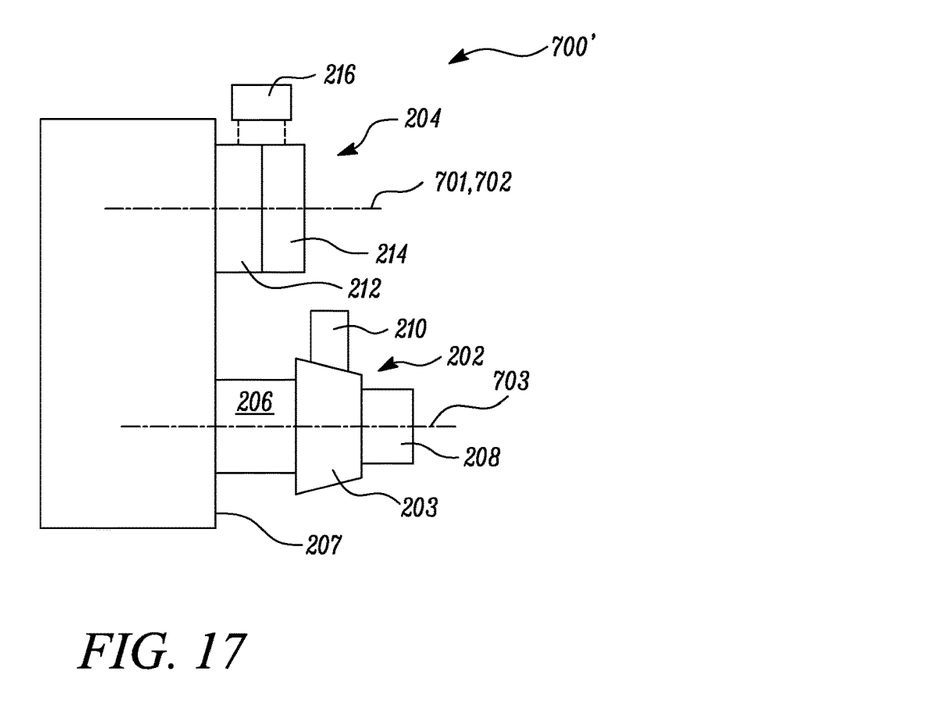
FIG. 17 is a schematic view of the cabin blower system and accessory gearbox wherein the cabin blower system is split into modules arranged on a same side of the accessory gearbox according to another embodiment.
Figure 18:
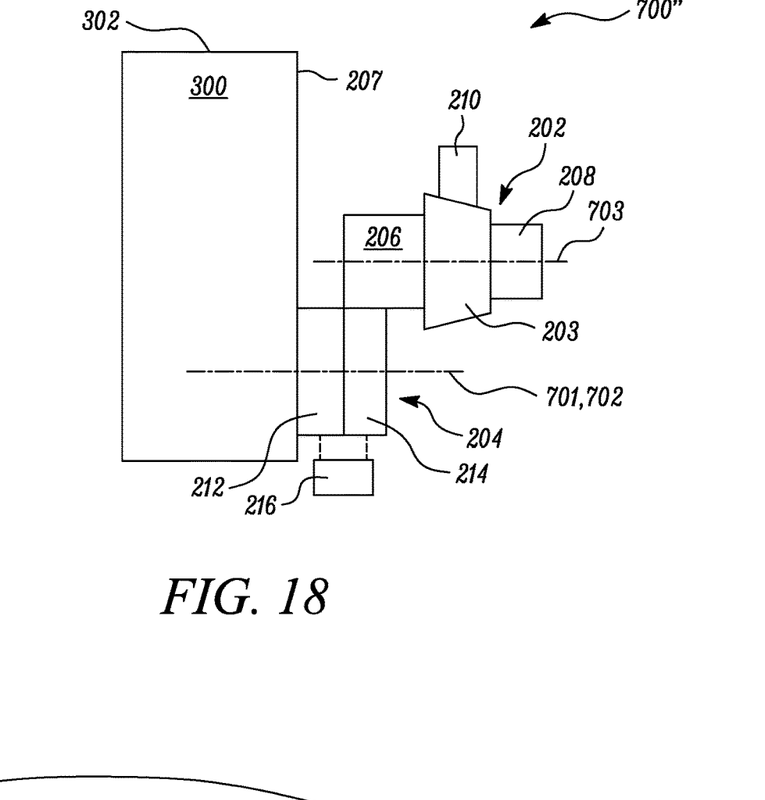
FIG. 18 is a schematic view of the cabin blower system and accessory gearbox wherein the cabin blower system is split into modules arranged on a same side of the accessory gearbox according to another embodiment.

FIGS. 16-18 illustrate embodiments of cabin blower systems wherein the cabin blower 202, the electric variator 204, and the differential gearbox 206 are all arranged on a same side of the accessory gearbox casing 302. For simplicity and consistency with the nomenclature used so far, the cabin blower 202, the electric variator 204, and the differential gearbox 206 may be seen as arranged on the second side 207 of the accessory gearbox casing 302, but the skilled person would recognise that any side of the accessory gearbox casing 302 may be referred to as the second side 207.

In FIG. 16 there is illustrated an embodiment of a cabin blower system 700, wherein the first and second machines 212, 214 of the electric variator 204 are arranged such that the first and second shaft (not illustrated for sake of simplicity) are coaxially arranged along coincident first and second axis 701, 702.

The cabin blower system 700 further comprise a differential gearbox 206 partially integrated within the accessory gearbox 300 as in the embodiments of FIGS. 8-10, 12, and 14. A known gear system connects the first and second shaft to the differential gearbox 206.

The cabin blower 202 comprises a compressor 203 driven by the third shaft (not shown) arranged along a third axis 703, parallel to, but not coincident with, the first and second axis 701, 702.

FIG. 17 illustrates a further embodiment of a cabin blower system 700' which differs from the cabin blower system 700 of FIG. 16 in that the differential gearbox 206 is not partially integrated with accessory gearbox 300. The accessory gearbox 206 protrudes from the accessory gearbox casing 302 and is arranged between the accessory gearbox 300 and the cabin blower 202.

FIG. 18 illustrates another embodiment of a cabin blower system 700" which differs from the cabin blower systems 700 and 700' of FIGS. 16 and 17 in that the differential gearbox 206 is arranged at a distance from the accessory gearbox 300. In detail, the cabin blower system 700" comprises an electric variator 204 with first and second electric machines 212, 214 arranged adjacent to the accessory gearbox 300 (as in the embodiments of FIGS. 16 and 17), and a differential gearbox 206, connected to the first and second electrical machines 212, 214 through known gears (not shown for sake of simplicity) and arranged at a distance from the accessory gearbox 300. As in the embodiments of FIGS. 16, 17 the first and second shaft (not illustrated) connected to the first and second electric machines 212, 214 are arranged along the first and second axis 701, 702, respectively. The cabin blower system 700 further comprises a cabin blower 202 connected to the differential gearbox through the third shaft (not illustrated) such as to be arranged at a distance from the accessory gearbox 300. The third shaft is arranged along the third axis 703. The first and second axis 701, 702 and the third axis 703 are parallel and mutually distanced.

The cabin blower systems according to the disclosure and illustrated with reference to FIGS. 4-18 comprise an accessory gearbox 300 that can be mounted either axially or circumferentially in the gas turbine engine.

Figure 19:
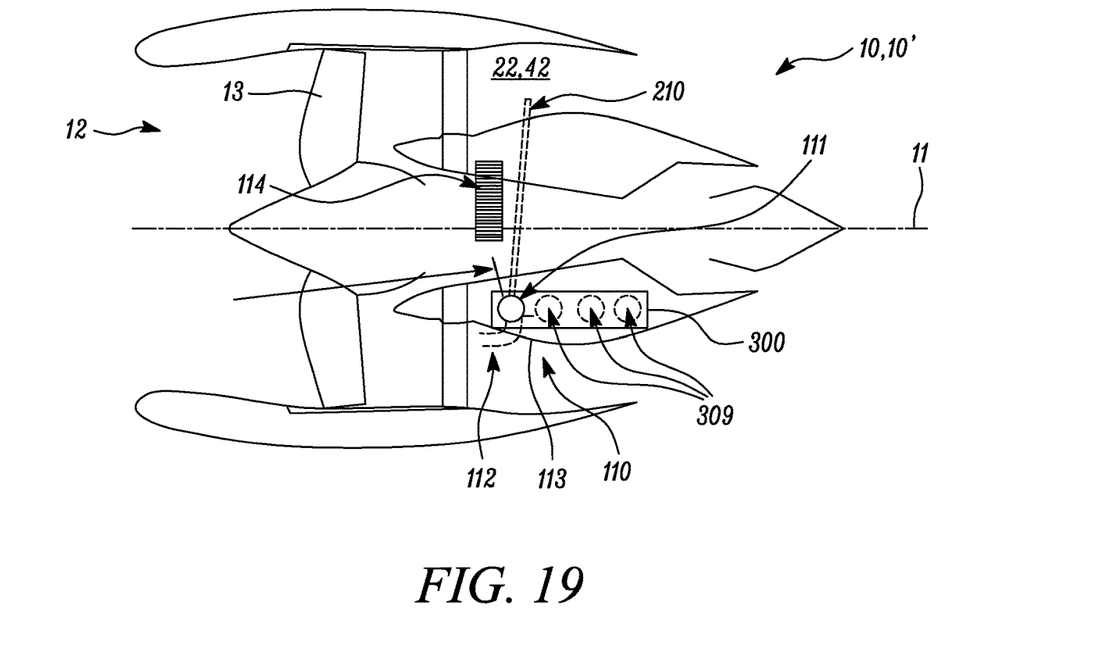
FIG. 19 is a sectional side view of a gas turbine engine illustrating an accessory gearbox in a first configuration.

FIG. 19 illustrates an embodiment of gas turbine engine according the disclosure wherein the accessory gearbox 300 is arranged axially, or in other words substantially parallel to the longitudinal axis 11 of the gas turbine engine, in a core accessory bay 110. The gas turbine engine may be either a direct drive gas turbine engine as the gas turbine engine 10 of FIG. 1, or a geared gas turbine engine as the gas turbine engine 10' of FIGS. 2 and 3.

The accessory gearbox 300 comprises a plurality of drive output pads 309, one of which is connected to a cabin blower system 111 of the type described with reference to FIGS. 4-18. Engine and airframe accessories (not illustrated), such for example fuel and oil pumps, are connected to the remaining drive output pads 309.

Fan air is scooped from the fan stream in the bypass duct 22 by means of a fan air offtake 112 connected to the air inlet of the cabin blower, compressed by the compressor (or impellers) of the cabin blower, and delivered through the air outlet 210 to the aircraft for cabin ventilation and pressurisation. The fan air offtake 112 is arranged in the bypass duct 22 and protrudes from a core faring 113 which defines a radially inner surface of the bypass duct 22. It is to be noted that such arrangement allows a short fan air offtake 112. In alternative embodiments, the fan air offtake 112 is arranged in the bypass duct 22 and protrudes from a nacelle inner wall.

The gas turbine engine may further comprise a heat exchanger 114 mounted from the core fairing 113 and configured to dissipate heat generated by the cabin blower system. Alternatively, heat generated by the cabin blower system may be dissipated by the engine cooling circuit (not illustrated).

The heat exchanger 114 is used to dissipate heat from the cabin blower system, and can be a surface heat exchanger mounted from the engine core fairings 113 as illustrated, so that the heat exchanger is cooled by the fan by-pass air. Equally the surface cooler could be mounted on any surface of the bypass duct 42 or splitters 116,117. Ideally the heat exchanger is mounted in close proximity to the cabin blower system.

Note a matrix heat exchanger fed by a dedicated offtake from the bypass duct 42 would be another means (not illustrated) of cooling the cabin blower system.

The fan air offtake may be arranged differently from the fan air offtake 112. For example, in the embodiment of FIG. 20, the fan air offtake 112' is arranged at a splitter faring.

Figure 20:
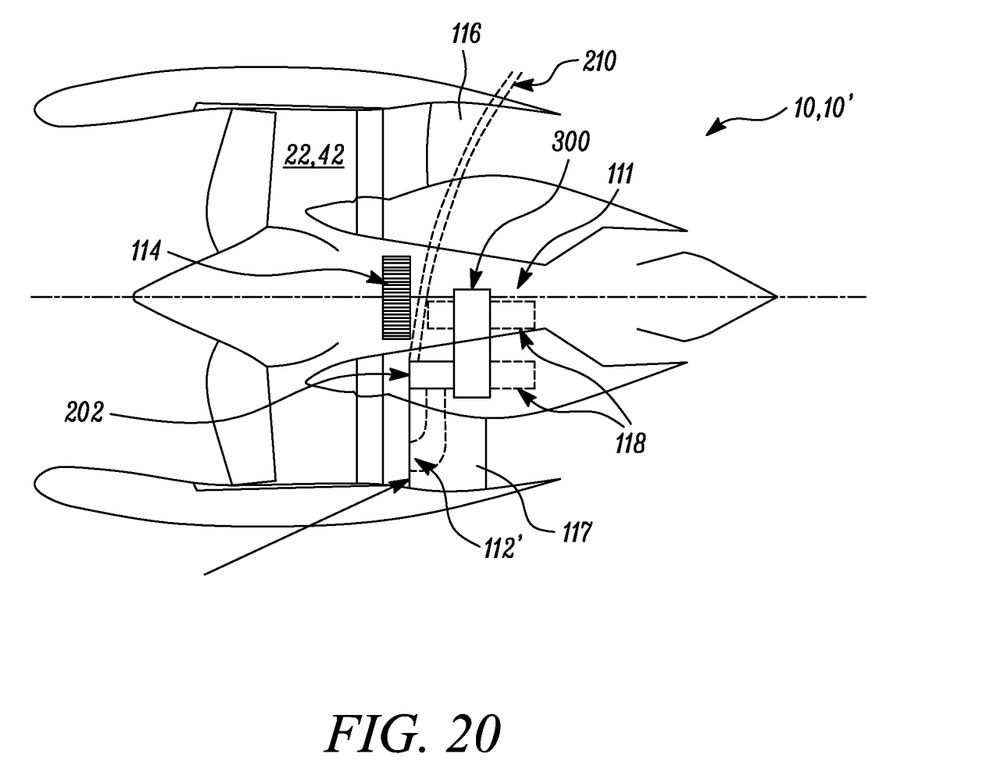
FIG. 20 is a sectional side view of a gas turbine engine illustrating an accessory gearbox in a second configuration.

In detail, FIG. 20 illustrates a gas turbine engine 10, 10' of the type illustrated with reference to FIGS. 1-3, comprising an accessory gearbox 300 arranged circumferentially from the core. A cabin blower system 111 of the type illustrated with reference to FIGS. 4-18 is connected to one of the drive output pads of the accessory gearbox 300. Engine and airframe accessories 118, such for example fuel and oil pumps, are connected to the remaining drive output pads 109.

The gas turbine engine further comprises an upper bifurcation, or upper splitter, 116 and a lower bifurcation, or lower splitter, 117 spanning the bypass duct 22. The upper splitter 116 and the lower splitter 117 comprise respective leading edges, trailing edges and a first and a second sidewalls connecting the leading edges and the trailing edges. The fan air offtake 112' may be either a forward facing offtake arranged on the lower splitter leading edge (as illustrated in FIG. 20), or a scoop on either the first or second sidewalls of the lower splitter 117. In alternative non-illustrated embodiments the fan air offtake 112' may be either a forward facing offtake arranged on the upper splitter leading edge, or a scoop on either the first or second sidewalls of the upper splitter 116.

The fan air offtake 112' provides air to the cabin blower 202 to be compressed by the compressor (or impellers) and delivered through the air outlet 210 to the aircraft for cabin ventilation and pressurisation.

The invention claimed is:

1. A gas turbine engine including:
   an engine core including a compressor, a combustor, and a turbine, the compressor being connected to the turbine through a respective shaft;
   an accessory gearbox arranged within an accessory gearbox casing that surrounds the accessory gearbox, a first axis passing through the accessory gearbox to define a first axial side of the accessory gearbox casing and a second axial side of the accessory gearbox casing opposite the first axial side; and
   a cabin blower system adapted to be driven by the accessory gearbox and comprising:
      an electric variator comprising a first electrical machine connected to a drive pad of the accessory gearbox by a first shaft arranged along the first axis, a second electrical machine connected to a second shaft arranged along a second axis, wherein the second shaft is arranged outside the accessory gearbox and does not pass through the accessory gearbox casing, and a power management system interconnecting the first and second electrical machines and controlling whether each of the first and second electrical machines operates as a motor or a generator;
      a differential gearbox having a first input connected to the drive pad of the accessory gearbox to receive drive therefrom, a second input connected to the second shaft of the second electrical machine, and an output; and
      a cabin blower comprising a cabin blower compressor driven by the output of the differential gearbox by a third shaft arranged along a third axis, wherein the third shaft passes all the way through the accessory gearbox casing from the first axial side to the second axial side, the cabin blower compressor comprising an air inlet and an air outlet;

wherein the cabin blower, the first electrical machine, the second electrical machine, and the differential gearbox are configured as modules, and wherein the first and second electrical machines are arranged on the first axial side of the accessory gearbox casing and the cabin blower is arranged on the second axial side of the accessory gearbox casing opposite the first axial side.

2. The gas turbine engine of claim 1, wherein the first and second electrical machines are ganged and the first and second shafts are coaxial with the drive pad of the accessory gearbox.

3. The gas turbine engine of claim 1, wherein the differential gearbox is an epicyclic gearbox comprising a summing gearbox and a step-up, amplifying gearbox.

4. The gas turbine engine of claim 3, wherein the summing gearbox is an epicyclic gearbox in a planetary arrangement and comprises a sun gear, a plurality of planet gears, a carrier connecting the planet gears, and a ring gear.

5. The gas turbine engine of claim 4, wherein the first shaft connects the accessory gearbox and the first electrical machine to drive the planet gears through the carrier, and the second shaft connects the second electrical machine to the sun gear of the summing gearbox.

6. The gas turbine engine of claim 5, wherein the step-up, amplifying gearbox is an epicyclic gearbox in a star arrangement and comprises a sun gear connected to the third shaft to drive the cabin blower.

7. The gas turbine engine of claim 1, wherein the first and second electrical machines are independently configured to work as electric motors and/or as power generators.

8. The gas turbine engine of claim 1, comprising a fan air offtake adapted to feed air to the cabin blower through the air inlet.

9. The gas turbine engine of claim 8, comprising a bypass duct, and wherein the fan air offtake is arranged in the bypass duct.

10. The gas turbine engine of claim 9, further comprising a bifurcation, or splitter, spanning the bypass duct and comprising a leading edge, a trailing edge and a first sidewall and a second sidewall connecting the leading edge and the trailing edge, wherein the fan air offtake is either a forward facing offtake arranged on the bifurcation leading edge, or a scoop on either the first or second sidewalls of the bifurcation.

11. The gas turbine engine of claim 1, further comprising a heat exchanger to cool the cabin blower system, wherein the heat exchanger is either a surface heat exchanger or a matrix cooler.

12. The gas turbine engine of claim 11, wherein the heat exchanger is a surface heat exchanger mounted from fairings of the engine core.

13. The gas turbine engine of claim 1, wherein the cabin blower compressor of the cabin blower is a dual impeller, mounted from the accessory gearbox casing.

14. An aircraft comprising the gas turbine engine of claim 1.

* * * * *